July 6, 1937.  W. F. BISKUP  2,085,945

LATHE ATTACHMENT

Filed Feb. 11, 1935

INVENTOR

By

*William F. Biskup*

Patented July 6, 1937

2,085,945

UNITED STATES PATENT OFFICE 2,085,945

LATHE ATTACHMENT

William F. Biskup, St. Paul, Minn.

Application February 11, 1935, Serial No. 5,939

3 Claims. (Cl. 82—28)

My invention is a composite high speed lathe attachment, the object of which is to convert standard belt driven engine lathes to wood turning and use of revolving cutters requiring variable speeds of high velocity.

The component parts of the attachment and its application to standard lathes are illustrated in the accompanying drawing, in which—

Figure 1:
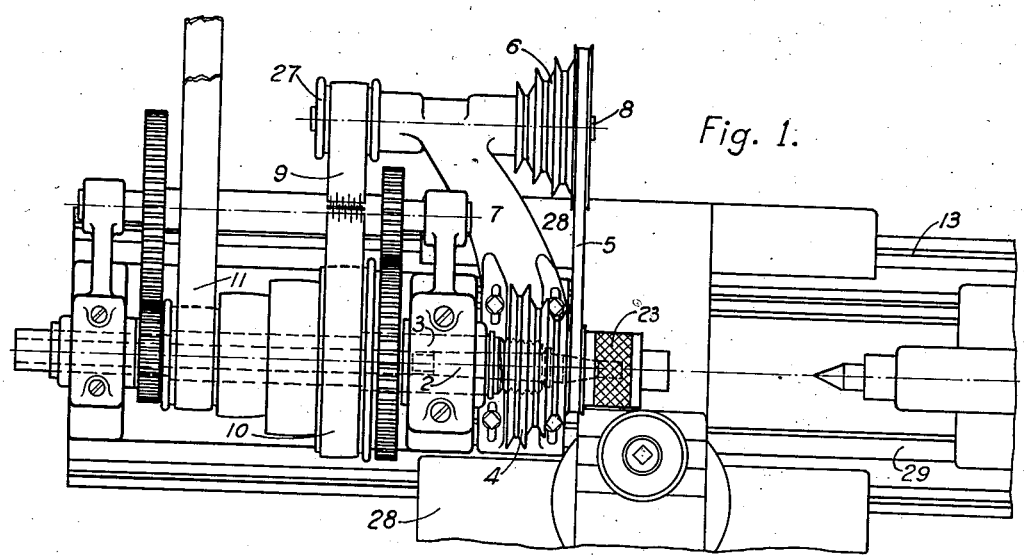
Figure 2:
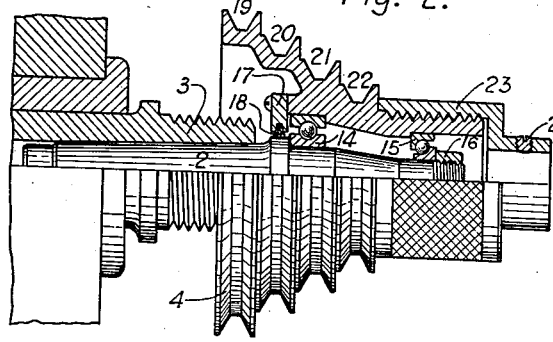

Figure 1 is a plan of the mechanisms and belts involved and shows their application to a standard engine lathe; Fig. 2 is a half section and elevation of the driving head; and Fig. 3, a detailed view of the countershaft clamped in position.

Similar numerals refer to similar parts throughout the several views.

Referring to Fig. 1 the parts of the attachment and their inter-relation and use are described as follows:

The first mechanism, a high speed driving head 4, rotating on an extended taper shank 2, is held in the spindle 3, of the engine lathe to support and align the same with the lathe centers. The high speed driving head 4, is driven by a continuous V belt from a similar cone pulley 6, on the countershaft 8, of the second mechanism 7, which is an attachable countershaft bracket bolted to the lathe bed by a single bolt 12, (shown in Fig. 3) and aligned by the rear way 13, of the lathe bed parallel to the center line of the lathe spindle, and supported at the foot by the flat way 29.

The countershaft 8, is driven by a mechanically jointed flat belt 9, from the large cone 10, of the lathe, which in turn is driven by the lathe motor in the usual manner by a belt, with the cone latch out and the cone running free.

By the use of the above mechanisms in the manner described and the manipulation of the belts 5 and 11, on their respective cones any standard belt driven engine lathe may be quickly converted to wood turning, and the use of revolving cutters, classes of work which require a wide range of high speeds.

By removing the V belt and driving out the taper shank from its support 2, in the lathe spindle 3, and loosening the bolt 12, on the countershaft bracket 7, then removing the same together with the jointed belt 9, the lathe is quickly cleared for its regular use.

Figure 2, shows in detail the construction of the driving head supported in place by means of the taper shank 2, in the lathe spindle 3. 14 is the main supporting ball bearing. By means of the nut 16, reacting on the outer steadying bearing 15, a close adjustment of the driving head may be attained. The felt ring 18, held by the retainer 17, protects the bearing. 19, 20, 21, 22, are the stepped grooves of the cone pulley, which is extended and threaded to receive the adapter 23, to which the shanks of cutters and drivers may be held by the set screw 24. A face plate may also be used instead of the adapter for wood turning.

Figure 3:
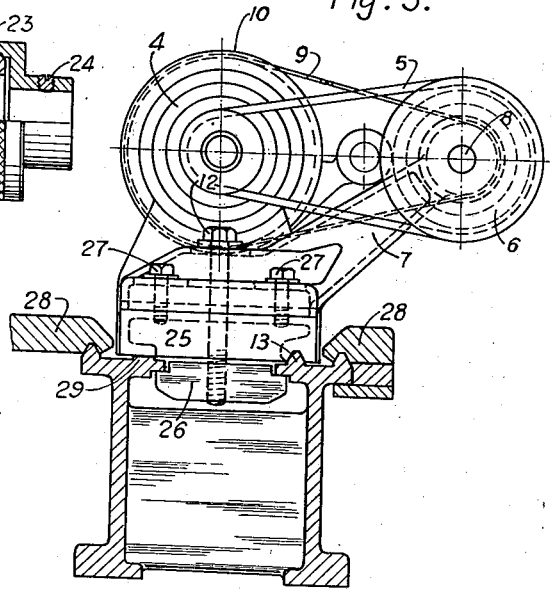

The construction of the countershaft bracket is shown in Figures 1 and 3. The cone pulley 6, 10 is driven by the countershaft 8, which in turn is driven by pulley 27. The countershaft 8, runs in bearings housed in the bracket 7. The bracket 7, is clamped through slotted holes to the bed block 25, by bolts 21, to permit lateral displacement 15 of the bracket 7, to provide for proper belt tension.

The bed block 25 is milled to fit the ways of the lathe and thus align the countershaft with the centerline of the lathe spindle.

The entire assembly is clamped to the lathe bed by means of the clamping block 26, and the bolt 12. The bed block 25, is made just wide enough to permit the lathe carriage runners 28, to clear its ends.

I claim:

1. In combination with the headstock spindle, pulley, carriage and bed of an engine lathe; a detachable driving head rotatably mounted on the lathe spindle, said driving head being provided with an adapter for interchangeably receiving the shanks of drivers or cutters; and convenient means of applying power to said driving head, said means comprising a readily detachable countershaft with auxiliary belt connections to the lathe headstock cone pulley.

2. In combination with the headstock spindle, pulley, carriage and bed of an engine lathe; a detachable driving head rotatably mounted on the lathe spindle, the combination in said driving head of a cone V pulley, provided with an adapter for interchangeably receiving the shanks of drivers or cutters, and a taper shank to which the driving head is journaled by an anti-friction bearing in such a manner as to bring all elements into positive adjustment by means of a nut, said taper shank providing a detachable connection to the lathe spindle; and means of applying power to said driving head consisting of a detachable countershaft with auxiliary belt connections to the lathe headstock cone pulley.

3. In combination with the headstock spindle, pulley, carriage and bed of an engine lathe; a detachable driving head rotatably mounted on the lathe spindle, said driving head provided with an adapter for interchangeably receiving the shanks of drivers or cutters and having a cone V pulley adaptable to a V belt drive; an auxiliary countershaft, said countershaft having a cone pulley on one end with belt connections to the aforesaid driving head cone V pulley, the other end having a single pulley with belt connections to the largest pulley of the lathe spindle, the countershaft being journaled in a bracket consisting of two sections slot-bolted together to permit belt adjustment, the bracket having a base milled to fit the lathe ways to align the same and provided with a convenient clamp to the lathe bed.

WILLIAM F. BISKUP.